(12) United States Patent
Haskett

(10) Patent No.: US 6,282,301 B1
(45) Date of Patent: Aug. 28, 2001

(54) ARES METHOD OF SUB-PIXEL TARGET DETECTION

(75) Inventor: Hanna T. Haskett, Woodbridge, VA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 09/288,071

(22) Filed: Apr. 8, 1999

(51) Int. Cl.[7] .................................................. G06K 9/00
(52) U.S. Cl. ............................................................ 382/103
(58) Field of Search ..................................... 382/100, 103, 382/181, 209, 210, 217, 218, 219, 220, 224; 348/25, 135; 353/11; 33/506; 342/89, 90, 147, 159, 165; 367/37, 38, 95, 901

(56) References Cited

U.S. PATENT DOCUMENTS

| | | | |
|---|---|---|---|
| 5,337,053 | * 8/1994 | Dwyer | 342/90 |
| 5,502,688 | * 3/1996 | Recchione et al. | 367/131 |
| 5,598,355 | * 1/1997 | Derou et al. | 342/159 |
| 5,644,508 | * 7/1997 | McNary et al. | 342/159 |
| 5,798,942 | * 8/1998 | Danchick et al. | 342/96 |
| 5,805,106 | * 9/1998 | Baum | 342/159 |
| 5,805,742 | * 9/1998 | Whitsitt | 382/275 |
| 6,023,235 | * 2/2000 | Sauer | 342/25 |
| 6,075,891 | * 6/2000 | Burman | 382/191 |
| 6,208,752 | * 3/2001 | Palmadesso et al. | 382/155 |

* cited by examiner

Primary Examiner—Andrew W. Johns
Assistant Examiner—Shervin Nakhjavan
(74) Attorney, Agent, or Firm—Milton W. Lee; John E. Holford; Alain L. Bashore

(57) ABSTRACT

Target detection using algorithms is based on the adaptive real-time endmembers selection from hyperspectral image data. New pixels are correlated with prestored clutter endmembers to obtain subsequently detected target and clutter pixels and then suppressing the latter, leaving about 10% of the image as targets. Targets are then reduced in number by size filtering.

7 Claims, 7 Drawing Sheets

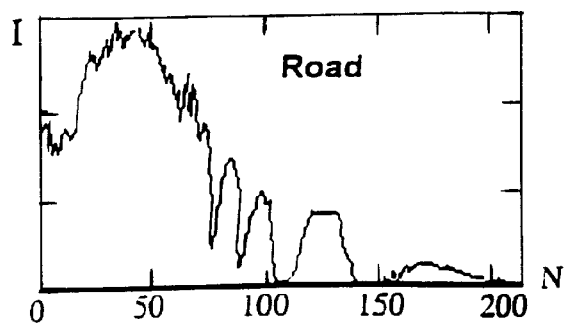
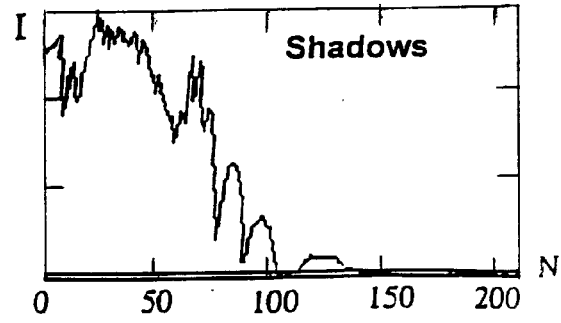
Figure 1e           Figure 1f
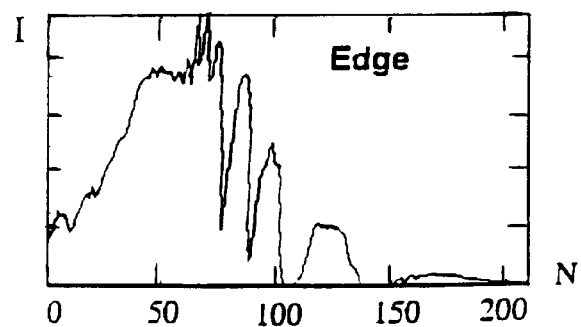
Figure 1g

ARES METHOD OF SUB-PIXEL TARGET DETECTION

BACKGROUND OF THE INVENTION

1. Field of the Invention

The present invention generally relates to hyperspectral image sensors, i.e. sensors wherein each pixel consists of a plurality of separately detected components each within predefined adjacent narrow frequency bands that cover the visible, infrared and far infrared spectrums.

2. Description of Prior Art

In prior art surveillance and reconnaissance applications, hyperspectral target identification technologies have been extensively investigated. The majority of the work has been focused on techniques using the Reed and Xiaoli (RX) multispectral detection algorithm, Linear Mixing Model (LMM) (or Spectral Unmixing) and spectral clustering. These are designed to detect sub-pixel or low spatial resolution targets (tens of pixels on targets) using spectral signatures and spatial properties of targets. Each of these techniques presents significant limitations in real-time surveillance and reconnaissance applications. RX target identification techniques assume targets have some known continuous spatial patterns with describable statistical properties; it also assumes gradual change in the spatial domain. However, edges (where the spectral signatures are highly correlated with man-made material spectral signatures) tend to produce high false alarm rates (FARs). Further RX, in its statistical modeling and hypothesis testing, quite often does not represent the target or background characteristics adequately. Spectral Clustering depends on the cluster initialization parameters, such as threshold values and numbers of iterations; which may not result in the desired number of clusters. Reinitialization may cause unacceptable rates of convergence, hence, spectral clustering techniques are not feasible for real-time detection. LMM assumes that the spectral signature of the pixel in the scene is a linear combination of spectral signatures for pure endmembers; such as sand, water, grass, trees, etc. Even if pure endmember spectral signatures can be obtained, the spectral signature of the pixel in the scene does not represent only the linear combination of pure endmembers, but also system and atmospheric parameters which alter spectral information. The signature is also dependent on lighting conditions, clutter and, worse yet, sensor artifacts which affect apparent radiance. Spectral clustering techniques present greater difficulties when operated in real-time scenarios, since they depend on an iterative clustering algorithm of indeterminate length which may or may not converge to produce usable clusters. Thus, spectral clustering is not dependable for real-time operation.

SUMMARY OF THE INVENTION

In the ARES method of target identification algorithms are provided that are based on the adaptive real-time endmembers selection. This method suppresses the clutter by correlating a test pixel with the clutter (not with targets of interest as traditionally done). Since clutter dominates 90% or more of the scene image, only a small percentage of man-made materials are left in the image as detections. This approach offers a robust technique for the selection of endmembers in real-time by letting the scene dictate its own endmembers. These in turn, fully represent scene characteristics. No assumptions have to be made about either target or background.

BRIEF DESCRIPTION OF THE DRAWINGS

The foregoing and other objects, aspects and advantages will be better understood from the following detailed description of a preferred embodiment of the invention with reference to the drawings, in which:

FIGS. 1a–1g show the spectral signatures of a tree, grass, a tank, a commercial vehicle, a road, a shadow and an edge, respectively, using a one meter footprint in the morning;

DETAILED DESCRIPTION OF A PREFERRED EMBODIMENT OF THE INVENTION

Figure 1A:
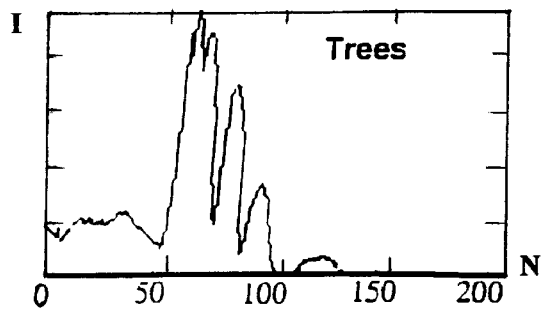
Figure 1B:
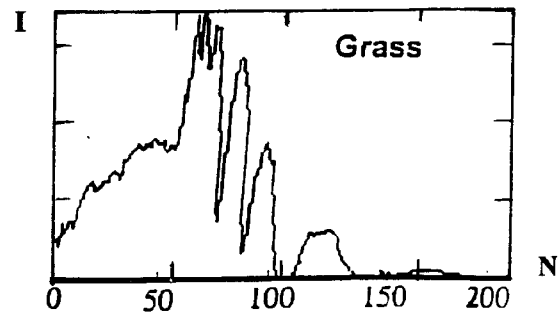

The ARES target detection method requires a prerecorded library of endmembers based mainly on natural clutter. Endmembers are vector quantities representing the spectral signatures of pixel locations from the current sensor scan line that contain various types of natural clutter. Each endmember is normalized by dividing its magnitude by its modulus (the square root of the sum of the squares of its vector is component magnitudes) to form a unity vector. One normalized endmember, based on a pixel location representing a man made material, is included in the library to maximize clutter suppression as the ARES correlation proceeds.

The U.S. Army's Forest Radiance I database collected with the HYDICE hyperspectral sensor at Aberdeen Proving Ground in Maryland has been utilized to demonstrate that the algorithm to be described in this patent is sufficiently robust and optimized to accommodate high throughput, real-time, subpixel, hyperspectral target detection (or identification of terrain) in surveillance and reconnaissance applications. Scenarios include targets in the open, with footprints (square pixel size at the target) of one, two and four meters; and at different times of the day. The data set, all of which was used, covers a total area of about 10 square kilometers.

The above spectral information was obtained from the environment (natural and man-made) via an electro-optical sensor that quantizes hyperspectral pixels in two spatial dimensions. A natural question that arises is: does the footprint size of the sensor pixel affect the nature of the spectral information collected? The data indicates that the answer is both yes and no. As will be seen, the spectral signatures remain unique within a given footprint size, but differ somewhat from the same signatures collected with pixel footprints of different sizes. Spectral signatures of each image element are, however, consistently similar (in shape, but not intensity) throughout the image scene and spectral signatures are unique and distinguishable between image elements. For instance, spectral signatures of a tank and a commercial vehicle have been calculated by three measurement techniques [MDP, MVE and MMSE], to be described presently. Although the results were slightly different, each signature had its own unique profile.

The sensor is a nadir-viewing, push-broom, imaging spectroradiometer. The ground sampling distance (GSD or footprint) varies from one to four meters depending on aircraft altitude above the ground level (AGL) of 6000 to 20000 feet. The spectral range of the sensor extends through the visible into the infrared wavelengths of 400 to 2500 nanometers. The sensor system attributes are shown below:

| System Attribute | Specification |
|---|---|
| Platform | CV-580 Twin Turbo-Prop Aircraft |
| AGL | 2000–7500 m |
| V/H (aircraft limits) | 0.0127–0.059 rads/sec |
| Swath Field of View | 8.94° |
| Swath width | 308 pixels |
| IFOV | 0.507 mrad(average) |
| Array size | 320 × 210 pixels |
| Integration time | 1.0–42.3 msec |
| Quantization | 12 bits |

As with the library endmember entries, the spectral content of a scene endmember is represented by a vector. A pixel in a scene (also a vector) with which the endmember is coincident will thus possess a zero angle of intersection. The vector angle of intersection, or spectral difference information, which is used as a discrimination factor for sub-pixel target detection in clutter background, may be obtained from two vectors that represent the test pixel spectral signature and the previously stored endmember by one of the following previously mentioned methods:

1) finding the maximum of a simple dot product (MDP);
2) calculation of minimum mean square error (MMSE); or
3) calculation of minimum variance error (MVE).

All three methods are implemented in this application. The spectral angle/difference between the end members and the test pixel may be obtained using one or more of the following equations:

1) Let $\vec{\alpha}$ represent an endmember; $\vec{\beta}$ the test pixel; n the number of spectral channels, $\alpha_i$ the ith channel component of the endmember and $\beta_i$ the ith channel component of the pixel. The spectral angle $\theta$ between the test pixel and the endmember is defined by a normalized dot product as:

$$\cos\theta = \frac{\vec{\alpha} \cdot \vec{\beta}}{|\vec{\alpha}||\vec{\beta}|} = \frac{\sum_{i=0}^{n-1} \alpha_i \beta_i}{\sqrt{\sum_{i=0}^{n-1} \alpha_i^2} \sqrt{\sum_{i=0}^{n-1} \beta_i^2}} \quad \text{Equation 1.}$$

2) Mean Square Error $\epsilon$ between the test pixel and the endmember is defined as:

$$\varepsilon = \frac{\left(\frac{\vec{\alpha}}{|\vec{\alpha}|} - \frac{\vec{\beta}}{|\vec{\beta}|}\right)^2}{n} = \frac{\sum_{i=0}^{n-1}\left(\frac{\alpha_i}{\sqrt{\sum_{i=0}^{n-1}\alpha_i^2}} - \frac{\beta_i}{\sqrt{\sum_{i=0}^{n-1}\beta_i^2}}\right)^2}{n} \quad \text{Equation 2.}$$

and

3) Variance of the error $\gamma$ between the test pixel and the endmember is defined by the following equations:

$$\text{Let } \vec{\tau} = \left(\frac{\vec{\alpha}}{|\vec{\alpha}|} - \frac{\vec{\beta}}{|\vec{\beta}|}\right) \text{ or} \quad \text{Equation 3a}$$

$$\tau_i = \frac{\alpha_i}{\sqrt{\sum_{i=0}^{n-1}\alpha_i^2}} - \frac{\beta_i}{\sqrt{\sum_{i=0}^{n-1}\beta_i^2}} \text{ and} \quad \text{Equation 3b}$$

$$\bar{\tau_i} = \frac{\sum_{i=0}^{n-1} \tau_i}{n} \quad \text{Equation 3c}$$

$$\text{then } \gamma = \frac{\sum_{i=0}^{n-1}(\tau_i - \mu)^2}{n-1} \quad \text{Equation 3d.}$$

Non-unity vector amplitudes will mask the required angular information. This difficulty is avoided by the vector normalization, so only the angular disturbance remains. It will also be seen that the MSE or MVE produce identical results as the dot product with unity vector amplitudes.

Figure 1C:
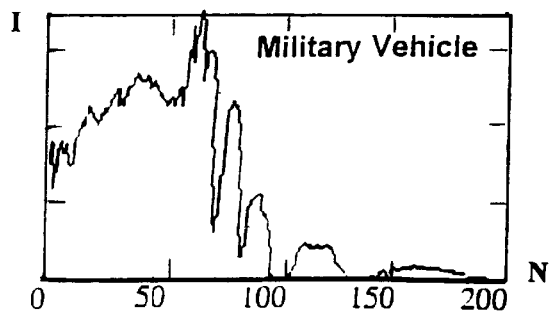
Figure 1D:
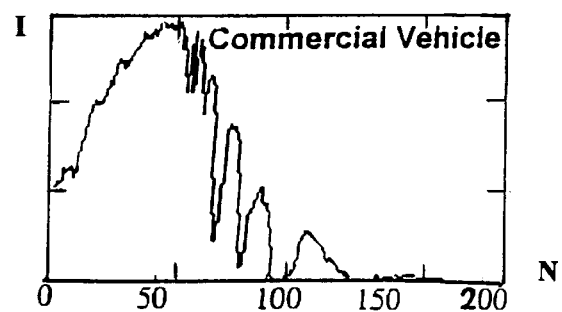

FIGS. 1a–1g show, respectively, spectral signatures of image elements for a tree, grass, a tank, a commercial vehicle, a road, a shadow and an edge based on a one meter footprint in the morning. The signature is originally defined by 210 wavelength bands extending from $0.4(1^{st})$ to 2.5 $\mu m(210^{th})$. The commercial vehicle has a spectral response in the wavelength of 1.95 um $(150^{th})$ to 2.42 um $(200^{th})$ while the spectral signature of the tank is virtually flat; and in the wavelengths of 1.42 um $(110^{th})$ to 1.87 um$(135^{th})$. The commercial vehicle possesses the shape of the bandpass response while the tank spectral signature rises to a point, then drops off gradually as shown in FIGS. 1c and 1(d). The above adjacent narrow bands signatures can be combined [Binned] to provide fewer broad band signatures. For example, the number of narrow bands combined may be 2, 3, 5, 6, 7, 10, 14, 21, 35, 42, 70, or 105.

Figure 2A:
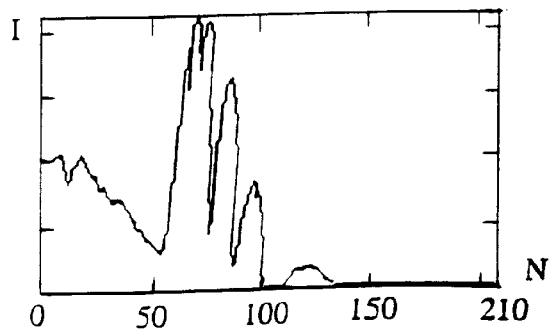
FIGS. 2a–2b show the spectral signatures of a tree and a tank respectively, using is a four meter footprint in the morning.
Figure 2B:
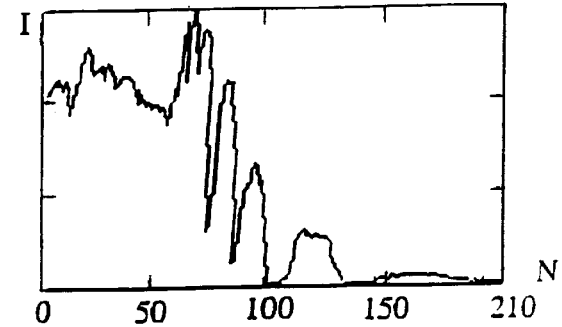

FIGS. 2a and 2b, respectively, show the signatures of a tree and a tank obtained with a four meter footprint in the morning.

Figure 3A:
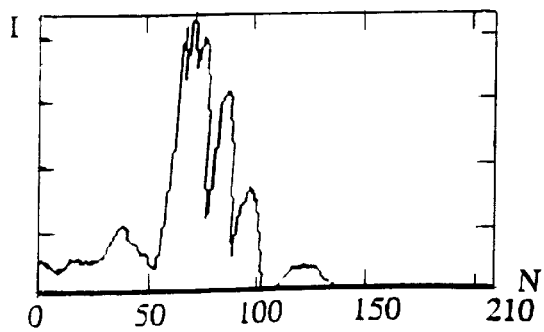
FIGS. 3a–3b show the spectral signatures of a tree and a tank respectively, using a one meter footprint in the afternoon.
Figure 3B:
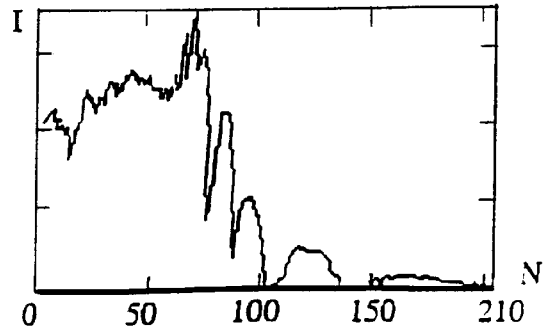

FIGS. 3a and 3b, respectively, show the signatures of a tree and a tank obtained with a one meter footprint in the afternoon.

Man-made materials have similar spectral profiles; likewise, natural clutter types have similar spectral profiles that differ from those of man-made materials. However, edge and shadow spectral signatures mimic the spectral profiles of man-made materials. Since shadow spectral signatures have similar profiles to man-made materials, it remains difficult to detect targets hidden in shadows. However, if a man-made target is isolated within natural clutter, with shadows having similar profiles to man-made materials, it enables a small target to be readily detectable since more pixels will be flagged as an "area of interest" by the algorithm. This algorithm suppresses only the natural clutter. Pixels which possess spectral signatures similar to man-made materials and their shadows will appear as detection.

Each natural clutter and man-made material has its own unique spectral profile. Natural clutter types, which are limited in numbers, include items such as sand, grass, trees and water. These items dominate 90% or more of the scene image. These observed properties have lead to the development of the adaptive real-time end-member selection and clutter rejection algorithm, described above, which lets the scene image dictate its own endmembers and takes advantage of the observed properties of the spectral signatures to perform clutter rejection and target detection. In addition, the spectral information contained in each pixel carries the same sensor artifacts or atmospheric conditions and spectral signatures are consistent throughout the image scene. Calibrations are not necessary and sensor artifacts are not issues for the algorithm developed in this paper, since endmembers are selected adaptively based upon the scene characteristics.

Conventional wisdom is that man-made and natural clutter are highly uncorrelated. In the case of single-band IR data, this property is more difficult to observe than with multiband hyperspectral data. Unlike radar signatures whose profiles vary significantly within the image scene with infinitesimal change in variables such as target aspect angle, or sensor (aircraft) orientation, the hyperspectral signatures are more consistent for each image element and distinguishable between image elements throughout the image scene. This probably is the most attractive feature of hyper-spectral signatures, since information is provided with minimum variance in the spectral profile. The consistency of hyper-spectral signatures in the image scene provides an enormously positive impact on image understanding and exploitation, especially at a ground station. There are questions of sufficient sizes of spatial and spectral target cues that can convey enough spectral and spatial information about targets. These target cues are to be sent down to the ground station for analysis through a data link with limited bandwidth. Since each pixel that contains a particular image element possesses the similar and unique spectral signature consistently throughout the image scene, only tens of pixels around the detected location are needed to provide sufficient spectral information about targets and their background. Since not much more information is offered by sending large target cues, i.e. hundreds of pixels, sending hundreds of pixels around detected targets is unnecessary and wasteful of bandwidth.

Table 1 shows an example of spectral angles between image elements. Table 2 shows an example of the spectral difference of image elements by the calculation of the variance method. Table 3 shows an example of the spectral difference of image elements by the mean square error method. Values in the parentheses of Tables 1, 2 and 3 represent the spectral angles/differences ordered in the vertical direction, i.e. the smaller the value rank the greater the difference between image elements. Note that ordering of values in each of the three methods shown in Tables 1, 2 and 3 are identical.

TABLE 1

Spectral Angle in Degrees Between Image Elements by Correlation Method

|  | Tank | Com. Veh. | Road | Shadow | Grass | Tree |
|---|---|---|---|---|---|---|
| Tank | 0 (1) | 10.6 (1) | 14.5 (1) | 17.6 (2) | 18.7 (4) | 32.4 (4) |
| Com. Veh. | — | 0 (2) | 11.5 (2) | 18.6 (1) | 24.8 (3) | 41.0 (3) |
| Road | — | — | 0 (3) | 12.6 (3) | 30 9 (2) | 45 5 (2) |
| Shadow | — | — | — | 0 (4) | 35.1 (1) | 45 7 (1) |
| Grass | — | — | — | — | 0 (5) | 19.1 (5) |
| Tree | — | — | — | — | — | 0 (6) |

TABLE 2

Mean Square Error Between Image Elements

|  | Tank | Com. Veh | Road | Shadow | Grass | Tree |
|---|---|---|---|---|---|---|
| Tank | 0 (1) | .00016 (1) | .00031 (1) | .00044 (2) | .000506 (4) | .00140 (4) |
| Com. Veh. | — | 0 (2) | .00018 (2) | .00049 (1) | .00088 (3) | .00230 (3) |
| Road | — | — | 0 (3) | .00021 (3) | .00135 (2) | .00280 (2) |
| Shadow | — | — | — | 0 (4) | .00170 (1) | .00290 (1) |
| Grass | — | — | — | — | 0 (5) | .00048 (5) |
| Tree | — | — | — | — | — | 0 (6) |

TABLE 3

Variance of The Spectral Difference Between Image Elements

|  | Tank | Com. Veh | Road | Shadow | Grass | Tree |
|---|---|---|---|---|---|---|
| Tank | 0 (1) | .00017 (1) | .00031 (1) | .00045 (2) | .00051 (4) | .00149 (4) |
| Com. Veh. | — | 0 (2) | .00018 (2) | .00049 (1) | .00088 (3) | .00233 (3) |
| Road | — | — | (0) (3) | .00023 (3) | .00135 (2) | .00285 (2) |
| Shadow | — | — | — | 0 (4) | .00173 (1) | .00287 (1) |
| Grass | — | — | — | — | 0 (5) | .00052 (5) |
| Tree | — | — | — | — | — | 0 (6) |

The spectral angle or difference of the image elements by three methods, MSE, dot product and variance, in table 1, 2 and 3 show the consistency in the ranking order of correlations of the image constituents. Grass and trees are the least different with each other in comparison with other man-made materials. Vehicles are the least different with each other than with roads or shadows. In general, trees are significantly different from other elements in the image except grass. Trees and shadows are the most different. Trees and roads are the second most different. Vehicles are the least different.

A few methods have been reported to select endmembers contained in a scene image off-line. To applicant's knowledge, however, no real-time endmember selection capabilities have been published. A method, opposite to the traditional way of choosing endmembers, is developed herein for real-time endmember selection and clutter rejection. The natural clutter types, which dominate 90% or more of a scene image, are chosen as endmembers. The test pixel is correlated with all the natural clutter endmembers in the scene, not the targets of interest as traditionally done. Natural clutter is suppressed by this process with only the man-made objects and shadows left in the image. This is a great benefit for sub-pixel target detection, since the detection appears (by default) in the image by the clutter suppression process. As shadows are highly correlated with man-made materials, small targets effectively become larger. However, shadowed areas of natural backgrounds yield results that would indicate the presence of a man-made object. Based on spectral analysis of the hyperspectral data, the ARES algorithm is built upon the following findings;

(1) The spectral signatures of the pixels containing a particular material are similar (in shape, but not intensity) throughout an image;

(2) Each particular material contained in any pixel possesses its own unique, distinguishable spectral signature;

(3) Natural clutter spectral signatures are different from man-made material spectral signatures;

(4) Natural clutter dominates a majority of the image scene and is limited in variety, such as trees, grass, sand, and water;

(5) Edges and shadow spectral shapes are similar to man-made material spectral shapes, as demonstrated earlier, based on the spectral signature analysis of the image elements; and (6) The correlations between target and clutter vary more widely than the correlations between clutter types.

Based on these findings, the ARES algorithm is developed. Natural clutter types which dominate 90% or more of a scene image, are chosen as endmembers. The test pixel is correlated with all the natural clutter endmembers in the scene (as opposed to the as targets of interest). Natural clutter is suppressed by the ARES algorithm using the spectral angle discriminator, so that only the man made objects and shadows are left in the image. This presents a significant benefit for sub-pixel target detection, since the detection appears (by default) in the image by the clutter suppression process. Because the shadows are highly correlated with man-made materials, small targets effectively become larger. However, shadowed area of natural backgrounds yield results that would indicate the presence of a man-made object.

Applicant's adaptive Real-Time Endmember Selection and Clutter Suppression Method consists of the steps that follow.:

A) Prescanning the scene is preferably from an aircraft to obtain a complete set of endmember pixels, which represent image elements as spectral signatures, each comprising n different wavelength bands.

B) Processing these pixels either in the aircraft or from signals relayed to a ground station to obtain normalized unity vectors or endmembers.

C) Deleting all substantially redundant clutter endmembers. Types of natural clutter in the image scene or terrain are assessed by the operator at the ground station or at the sensor platform. In real-time, the spectral signature of pixel locations that contain types of natural clutter are chosen as endmembers from the current sensor scan line or when possible during the scene scan. Each endmember is normalized by dividing by its norm. The set of resulting endmembers are stored (and updated as new types of natural clutter appear in the ensuing data) in a library to be used in the clutter rejection process. The number of different types of the natural clutter in the scene, which is very few (water, sand, tree, grass, bushes), dictate the numbers of endmembers. The spectral signature of each type of natural clutter is considered an end member spectral signature. For maximum clutter rejection, all the possible natural clutter types in the scene should be exhausted.

D) Deleting all but one of the remaining undeleted endmembers which represent man-made materials. One of the normalized man-made material spectral signatures is stored in the library initially for clutter suppression process. This does not necessarily have to be a signature of a target, or even of a target in the scene, but a man-made material spectral signature from the scene is preferred. This will maximize natural clutter versus man-made material separation score. Because of the need to obtain the maximum natural clutter and man-made material separation score, it should be emphasized that it is important to have a man-made material signature in the library;

E) Storing the library of undeleted endmembers is in a section of the memory bank of, preferably, the same computer.

F) Scanning a new scene with the same sensor to obtain a raster of new pixels;

G) Normalizing and correlating each new pixel with each of the normalized endmembers in the library to obtain a score proportional, to the difference in their spectral angles. The correlation can be accomplished in any one of the ways that follow.

G1) Computing the normalized Euclidean inner product (dot product) is between each of the new pixels and all of the endmembers using Equation 1 above.

G2) Computing the mean square error between each of the new pixels and all of the endmembers using Equation 2 above.

G3) computing the variance of error between each of the new pixels and all of the endmembers using Equations 3$a$–3$d$ above.

H) Assigning each of the new pixels an initial contrast value of 1;

I) Changing the contrast value to zero, if the scores of the new pixel indicate the closest correlation is with a clutter endmember. For example a simple dot product or mean square error may be applied between the new pixel and the library endmembers (natural clutter spectral signatures) and a man-made material template. If the maximum score (cosine of spectral angle difference) is due to any one of the library's natural clutter endmembers then the new endmember is a non-detection (assigned a zero), otherwise it is a detection (assigned a one).

J) Removing additional non target data by adding a size filter, e.g. a computer program, which performs the steps that follow.

J1) Measuring the horizontal and vertical extent of new pixel groups having proximal pixels with values of 1.

J2) Revalueing to zero all pixels in such groups when the group is considered to be larger or smaller than valid targets.

K) Utilizing the data thus obtained for target acquisition. The pixels may thus be displayed for direct viewing in raster format as black or white, depending on their contrast values. Since all the natural clutter is highly correlated, and dominates most of the scene, the majority of the scene will be blanked-out, with only a small percentage of targets, i.e. man-made materials, shadows or edges left in the image. Alternatively the raw data may be fed to an autcomtic target recognition (ATR) system for further evaluation, classification, prioritization, etc. This may involve parallel processing and/or transferring of all raster lines or even pixels simultaneously.

Figure 4:
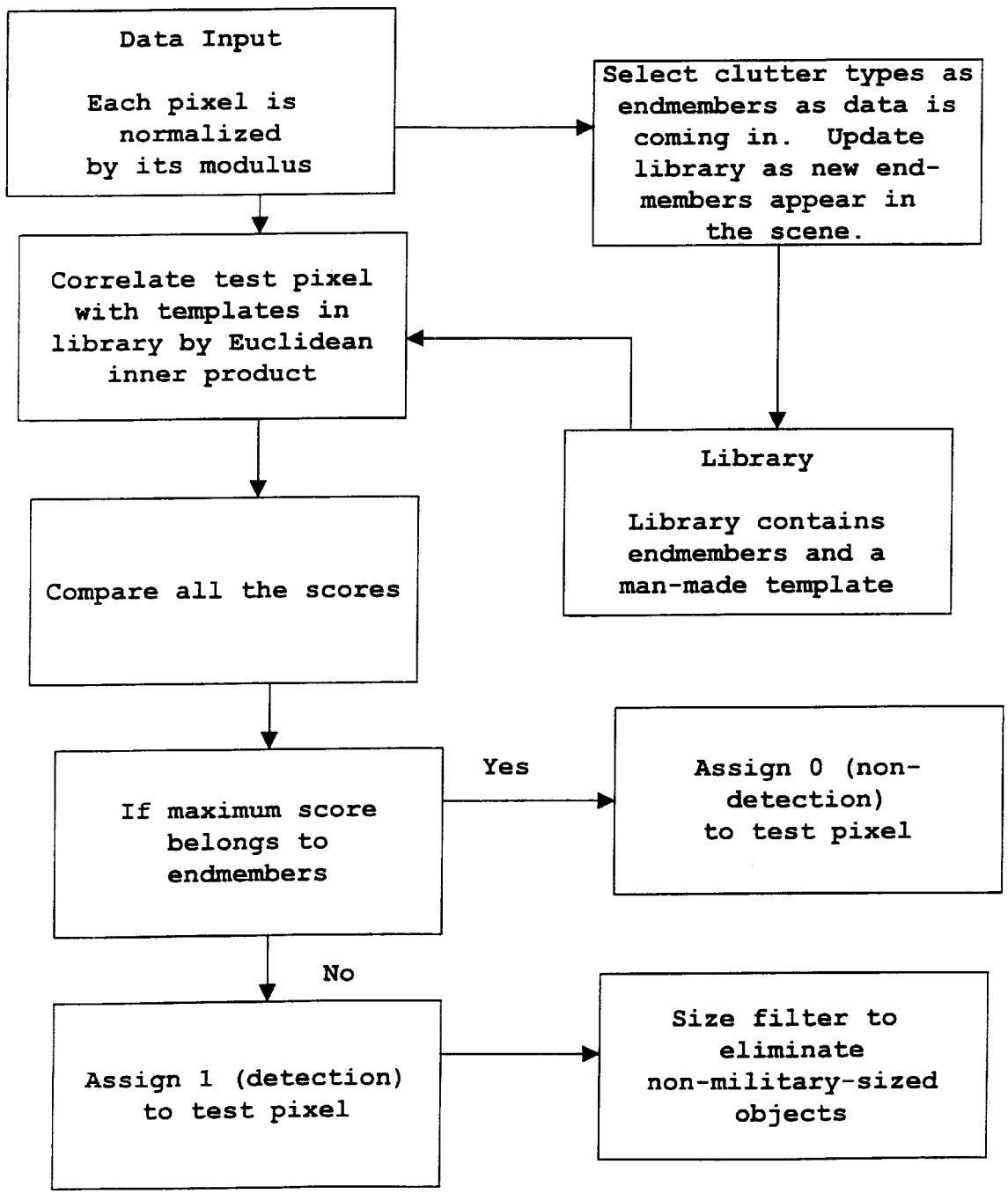
FIG. 4 shows a flow chart of the ARES method.

FIG. 4 shows a flow chart for the adaptive real-time endmember selection and clutter rejection process.

Figure 5A:
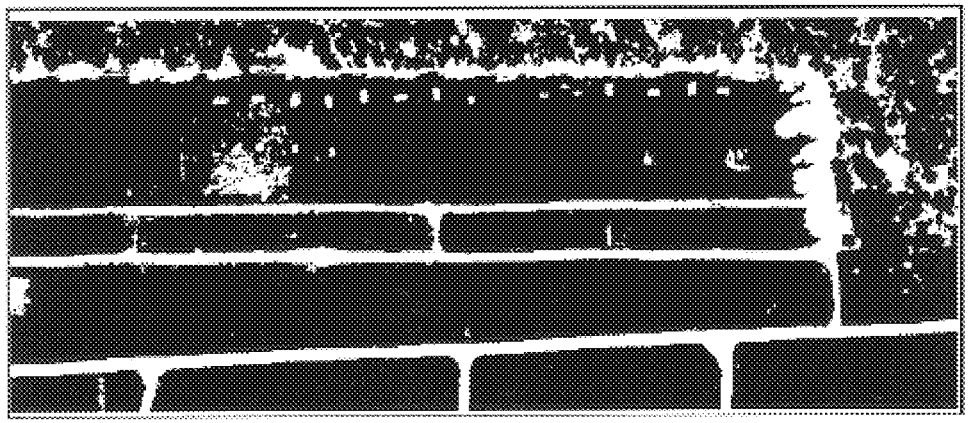
FIGS. 5a–5c show, respectively, targets as detected by the ARES method, detection by traditional methods and a single band image; all derived from the same input detector data using a one meter footprint.
Figure 6A:
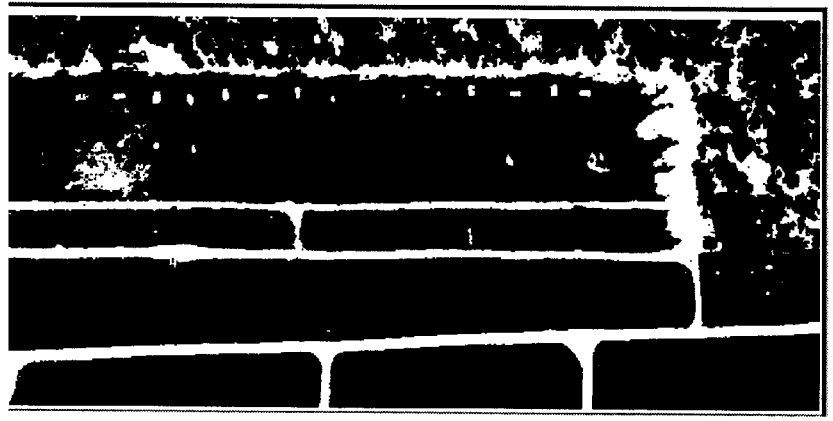
FIGS. 6a–6c show detection by the ARES method using MDP, MMSE and MVE, respectively, using a one meter footprint.
Figure 6B:
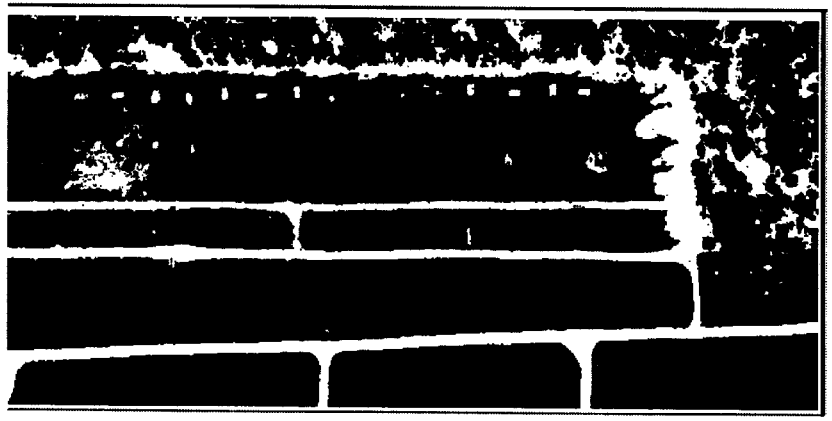

As shown in FIGS. 5a, 6a and 6b, the three methods produce identical visual results. The figures, respectively, show results obtained by calculation of dot product, MSE and MVE to obtain the maximum or minimum score between each new pixel and the library endmembers. It is preferred to utilize the Dot Product for real-time implementation since MSE or MVE involves subtraction, multiplication and division operations. The Dot Product only involves multiplication operations and is less significantly computationally intensive in real time.

Figure 5B:
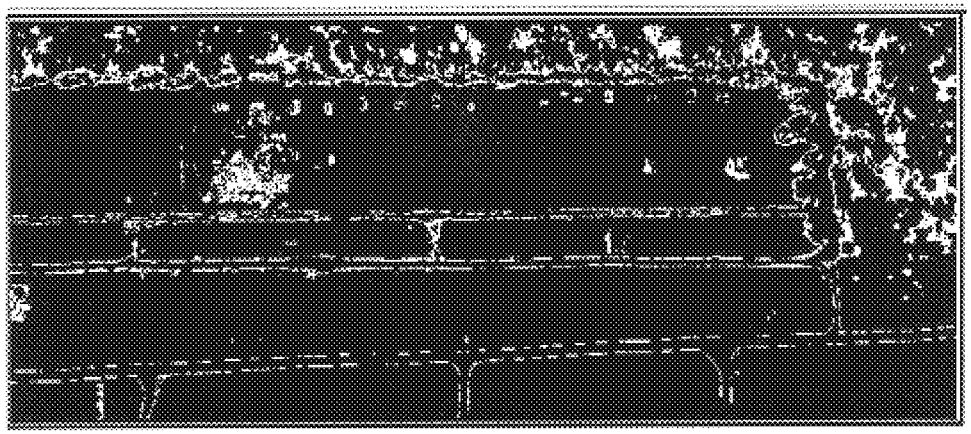
Figure 5C:
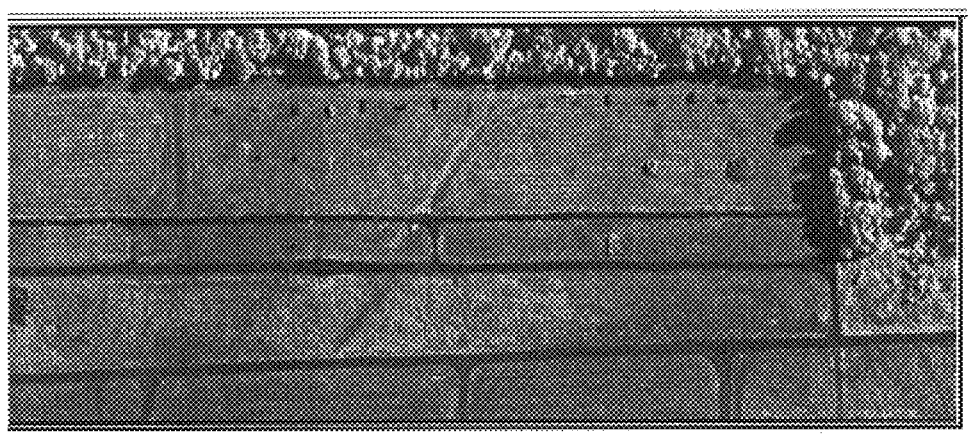

FIGS. 5a–5c show the results of different modes of detection. FIG. 5a, which is based on a one meter footprint, actually shows non-detections if the maximum correlation score belongs to the natural clutter profiles. As a result, the detection of man-made materials appears by default using this method. FIG. 5b shows the result if the detection is declared when the maximum correlation score belongs to the target template, as is traditionally done. The data used was the same as in FIG. 5(a). With a size filter implemented, it is obvious that FIG. 5a shows significant improvement in detection and lower False Alarm Rate (FAR) over FIG. 5b. FIG. 5c shows the single-band image of the data used in FIGS. 5a and 5b. Detection is declared, if maximum score belongs to the target (tank) template as traditionally done. This data was based on a one meter footprint. Clearly this image produces a much higher FAR than FIG. 5a or FIG. 5b.

Figure 6C:

FIG. 6c shows results for an ARES calculation with data from a four meter footprint pixel size. This footprint pixel size produces more false alarms, as expected.

Figure 7:
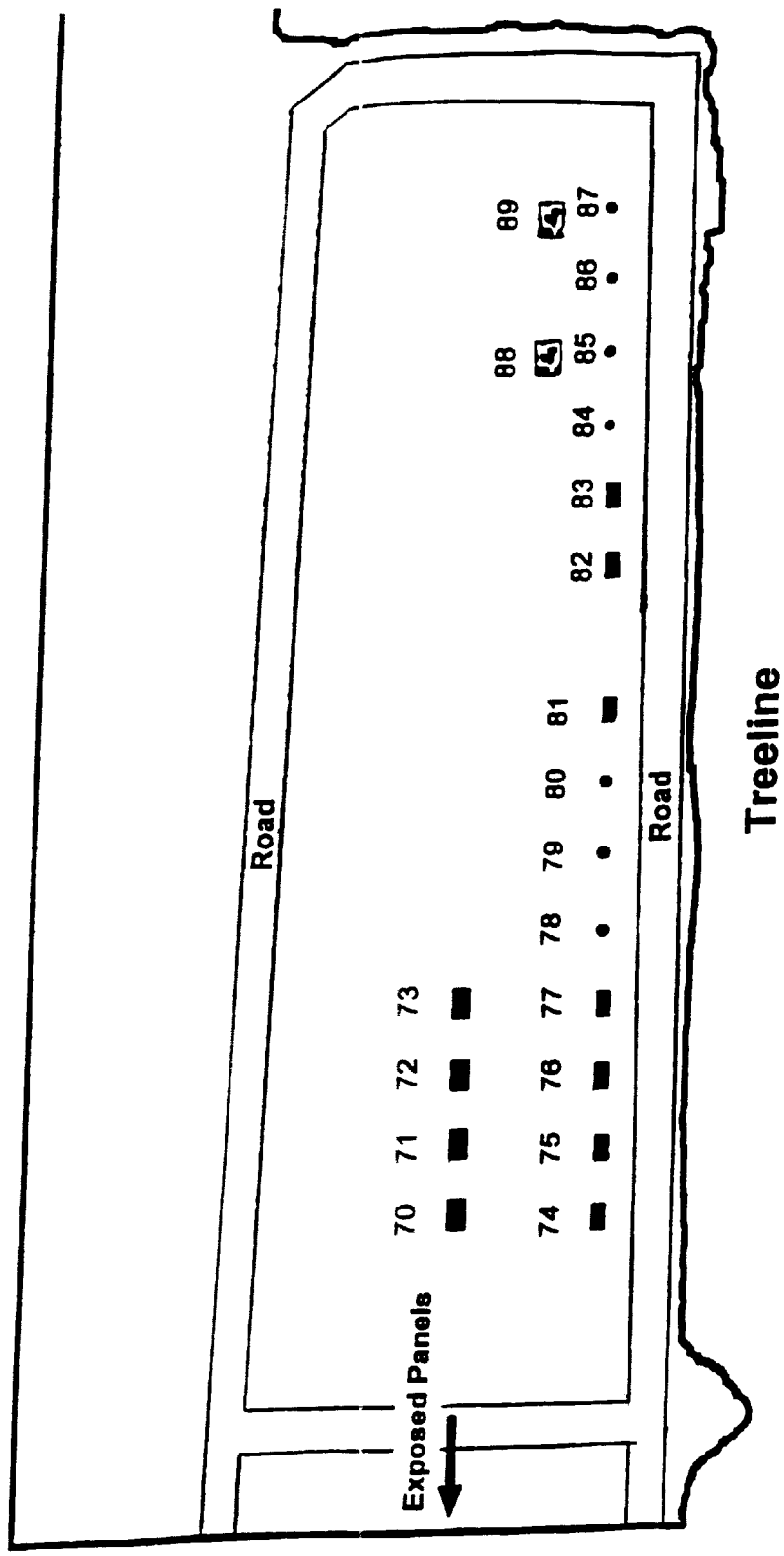
FIG. 7 shows the "image groundtruth" or ground measured size and location of the various targets of interest.

FIG. 7 shows a sketch of the image groundtruth, which correlates very closely with the ARES images shown above. The scene contains an open area with roads within a forested area delineated by the treelines shown. Targets 70–89 are arranged on the grassy area between the roads. Included are rocket launchers, tanks and smaller vehicles of domestic and foreign manufacture. The symbols are a rough indication of their size. Targets 88 and 89 are camouflage shelters.

While this invention has been described in terms of preferred embodiment consisting of a method of detecting targets in clutter by first detecting and eliminating clutter and eliminating unwanted targets by size, those skilled in the art will recognize that the invention can be practiced with modification within the spirit and scope of the appended claims.

Having thus described my invention, what I claim as new and desire to secure by Letters Patent is as follows:

1. A method for separating man-made military targets from natural background clutter while scanning a scene in a raster format with a hyperspectral pixel sensor, comprising the steps of:

A) Prescanning said scene to obtain a set of sample pixels;

B) normalizing each pixel of said set with a computer to provide a unity vector endmember with a spectral angle that represents the target signature of said sample pixel;

C) deleting all substantially redundant ones of said unity endmembers that represent various types of background clutter;

D) deleting all but one of the endmembers which represent man-made targets;

E) storing said remaining endmembers in a library section of the memory bank of said computer;

F) scanning a new scene with said sensor to obtain a set of new pixels;

G) normalizing said new pixels and correlating each one of said new pixels with all of said endmembers to provide each said new pixel with a set of scores proportional to its difference in spectral angle from each endmember;

H) assigning each of said new pixels a target contrast value of one;

I) separating targets from clutter by reassigning each of said new pixels a clutter contrast value of zero, if its scores indicate it correlates closest to a clutter endmember;

J) eliminating any group of said pixels, with contast value one that is too large or too small to be a valid target; and K) Utilizing the data thus obtained for target acquisition as it is processed.

2. A method according to claim 1, wherein step G further includes the substeps of:

G1) computing the normalized Euclidean inner products between each of said new pixels and each of said endmembers as a pair; and G2) assigning the pixel in each said pair a score proportional to its product.

3. A method according to claim 1, wherein step G further includes the substep of:

G1) computing the mean square error between each of said new pixels and each of said endmembers as a pair; and G2) assigning each said pair a score proportional to its mean square error.

4. A method according to claim 1, wherein step G further includes the substeps of:

G1) computing the variance of error between each of said new pixels and all of said endmembers;

G2) assigning said pixel a set of scores proportional to said variances.

5. A method according to claim 1, wherein step J further includes the following substeps:

J1) storing maximum and minimum thresholds for the vertical and horizontal size of valid targets in said computer;

J2) measuring the horizontal and vertical extent of pixel groups having proximal pixels with values of one; and J3) returning the contrast value of pixels in said groups to zero, if they are considered to be too large or too small for valid targets.

6. A method according to claim 1, wherein step K further includes the following substeps:

K1) displaying said pixels on a screen in raster format as black or white according to their contrast values: and K2) visually studying said screen.

7. A method according to claim 1, wherein step K further includes the following substeps:

K1) feeding the contrast values to an automatic target recognition system as they are processed.

* * * * *